Jan. 1, 1963  H. L. DUNLAP  3,071,085
CARGO BRACING BAR
Filed Aug. 5, 1958  2 Sheets-Sheet 2
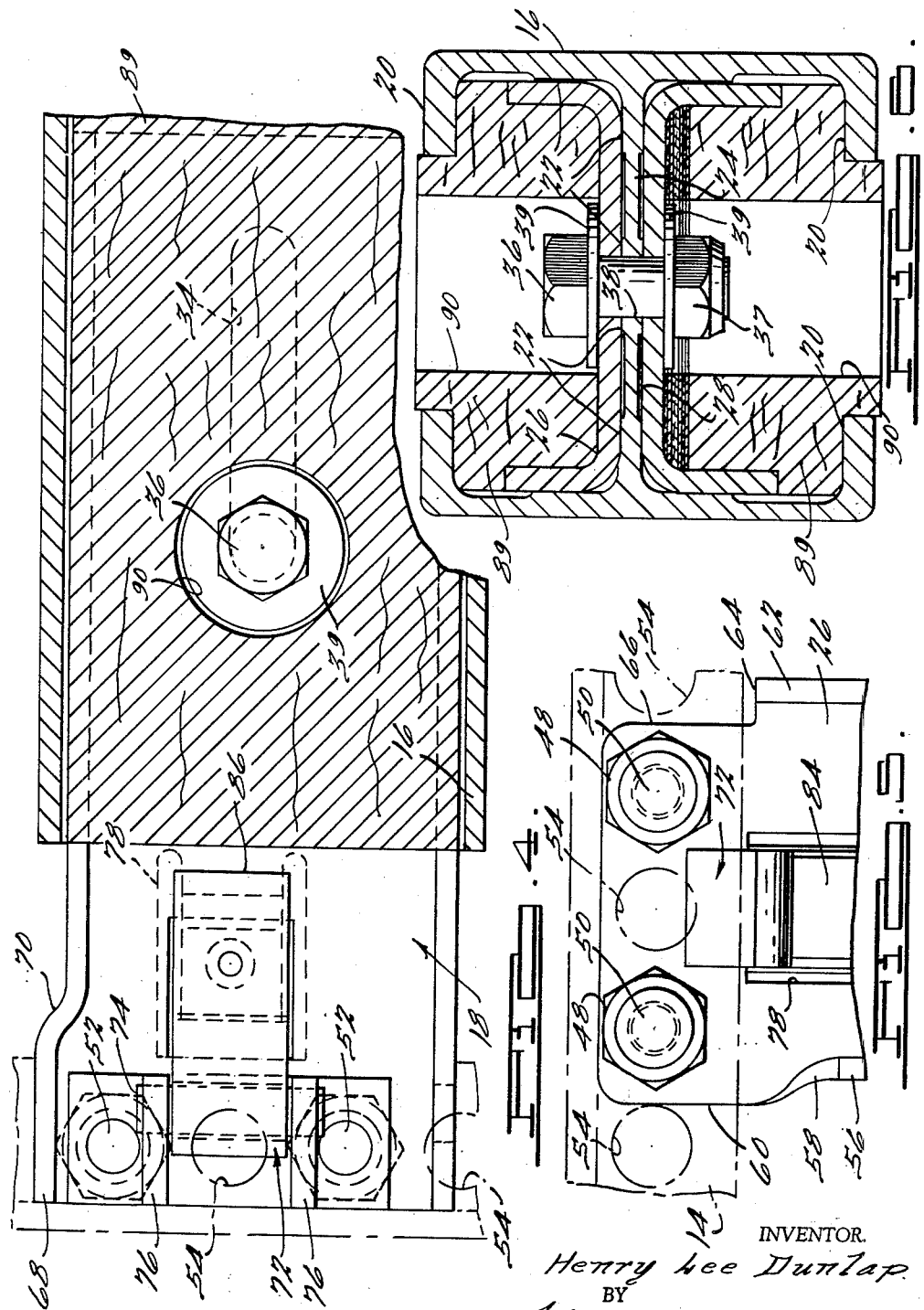
INVENTOR.
Henry Lee Dunlap
BY
Harness, Dickey & Pierce
ATTORNEYS

United States Patent Office 3,071,085
Patented Jan. 1, 1963

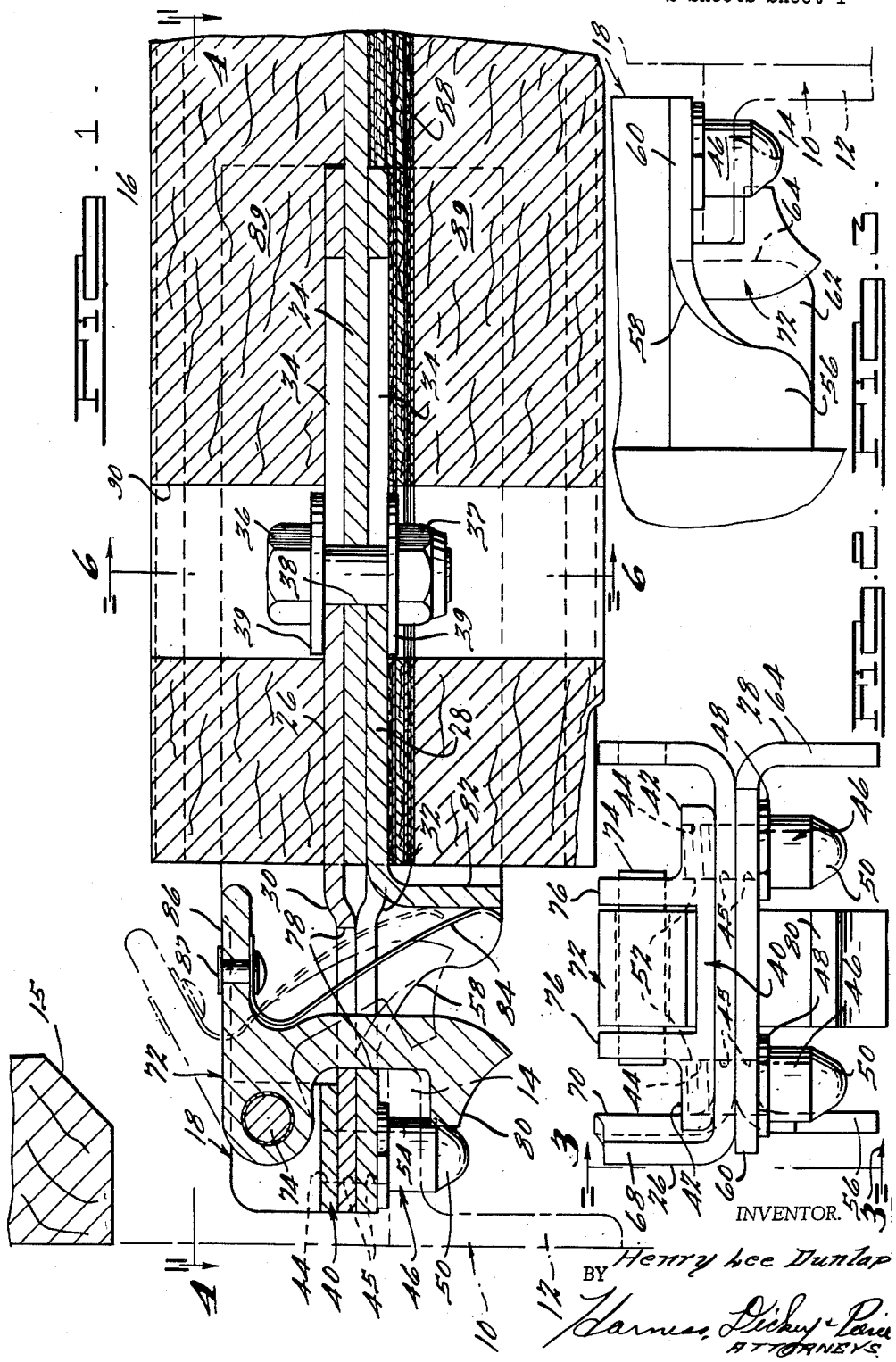

3,071,085
CARGO BRACING BAR
Henry L. Dunlap, Dearborn, Mich., assignor to Evans
Products Company, Plymouth, Mich., a corporation of
Delaware
Filed Aug. 5, 1958, Ser. No. 753,311
9 Claims. (Cl. 105—369)

This invention relates to cargo bracing equipment such as commonly used in trucks, railroad freight cars, ships and storage compartments in general where it is desired to hold articles of freight in a proper position so as to prevent damage to them. In particular, the invention refers to an improved cargo or freight bracing bar. It is related to that which is disclosed and claimed in a copending application, Serial No. 545,195, filed November 7, 1955 now Patent No. 2,879,721, dated March 31, 1959, and assigned to the assignee hereof and reference to that application as well as its parent cases, now Patent Nos. 2,497,683 and 2,725,826, will show in much greater detail the nature of the freight bracing equipment and systems in which the present invention may be employed.

The freight or cargo bracing bars used in freight bracing systems are provided with means at opposite ends whereby they may be quickly attached to and removed from suitable support elements in the freight storage compartment. In the case of moving vehicles the attaching means must be designed to positively hold the bar in place in spite of rather severe and sudden forces that may be applied to it in many different directions. It is also imperative that the attaching means be designed so that it can be readily connected to and disconnected from the support elements by workers with absolutely no training or mechanical skill. Further, it must be rugged enough to withstand rough usage and abuse and yet be light enough in weight to make its use practical.

With the foregoing requirements in mind, it is an object of the invention to provide a strong, lightweight, durable attaching means for the ends of a freight bracing bar which will automatically position itself an an operative or latching position but which automatically retracts while the bar is being connected to a support element.

It is a further object of the invention to provide a positive latch for a cargo bar designed so that loads on it tend to drive it more firmly into latching position.

Another object of the invention is to provide an attachment means embodying structure which accomplishes the above objects and the major components of which may be inexpensively fabricated from sheet metal channel-shaped members to make the attachment means lighter in weight so as to be practical in use for trucks.

Another object of the invention is to provide a lightweight cargo bar of I-shaped cross section having an attachment means fabricated from two channel-shaped members with webs thereof joined together at one end and spaced apart at the other end thereof to permit the attachment means to be telescopically mounted over the web of the cargo bar, said one end of the attachment means being adapted to releasably engage a supporting member mounted on the body of a truck.

It is also an object of the present invention to provide an improved freight bracing bar including a central web and having a construction providing an improved section modulus at right angles to its web.

It is also an object of the invention to provide a composite metal and wood bar of an improved construction and in which the shape of the metal component of the bar is such as to hold the wood component against movement transversely of the bar and in which the end fittings prevent movement of the wood components longitudinally of the bar.

Other objects and features of the invention will become apparent upon consideration of the accompanying drawings, wherein:

FIGURE 1 is a broken sectional view of one form of the invention;

FIGURE 2 is an end elevational view of the structure illustrated in FIGURE 1;

FIGURE 3 is a broken side elevational view of the structure illustrated in FIGURE 2, taken along the line 3—3 thereof;

FIGURE 4 is a sectional view of the structure illustrated in FIGURE 1, taken along the line 4—4 thereof;

FIGURE 5 is a broken bottom view of the structure illustrated in FIGURE 2; and,

FIGURE 6 is a sectional view of the structure illustrated in FIGURE 1, taken along the line 6—6 thereof.

As described in more detail in the patents and application referred to above, the freight cargo bracing bar of this invention (sometimes referred to also as a "cross" bar) is preferably used in connection with a support member 10 having a vertical flange 12 and a horizontal flange 14. In the case of a freight car, truck or trailer, the support members 10 are located in pairs on opposite sides of the body and extend longitudinally fore and aft of the body being ordinarily parallel to the floor and secured in a fixed manner as by welding to the side wall structure of the body.

Each pair of the support members 10 are commonly referred to as a "belt line" and are nearly always on the same level, that is, located the same distance above the floor of the body. The cross bar 16 has an end fitting 18 at each end which is adapted to be connected to the support members 10 so that the cross bar can extend transversely across the body.

While the structure just described represents a very common arrangement and application for cross bars of the present invention, it will be understood that the invention can be used in various other ways. A wooden buffer strip 15, as illustrated in FIGURE 1, may also be mounted on the body parallel to and spaced above each support member 10 to prevent contact between the freight and the horizontal flanges of the support rails so as to protect both the freight and the flanges.

As most clearly illustrated in FIGURE 6, the cross bar includes a metal component which is generally of an I-beam cross section having inwardly extending flanges 20. It is preferably extruded from a lightweight metal such as aluminum with pads 22 extruded integral therewith on both sides of the web 24 and on the adjacent portions of the inner surfaces of the flanges. If desired, the pads 22 may be broached adjacent the end of the cross bar to provide accurate sliding surfaces for telescopically receiving the end fitting 18. These pads 22 may thus be economically formed to provide limited area bearing surfaces.

The end fitting 18 is comprised of an upper channel-shaped member 26 and a lower channel-shaped member 28, preferably made of steel or the like for greater strength, and positioned back-to-back with a portion of their webs in engagement adjacent the left end of the end fitting and the remaining portion spaced apart by step portions 30 and 32 to permit the channels to be slidably mounted on the web 24 of the cross bar. Openings 34 are provided in the webs of each of the channels so as to cooperate with a bolt 36 passing through an aperture 38 in the web 24. These openings 34 may be of any desired length longitudinally of the bar and may provide either a fixed connection or one permitting any desired amount of telescopic movement. In the preferred embodiment illustrated, they are elongated, as illustrated in FIGURES 1 and 4, to permit the end fitting 18 to telescope relative to the cross bar. A nut 37 is threaded on the bolt to secure it in place and relatively large bearing washers 39 are disposed in engagement with the webs of the members 26 and 28 to provide suitable sliding surfaces.

A latch supporting member 40 is positioned on the left end of the web of the member 26, and is provided with horizontally extending flanges 42 having internally threaded apertures 44 therein which are aligned with suitable holes 45 in the webs of the channels 26 and 28. Two pins 46 each having a hexagonal shoulder 48, a conical end portion 50 and a threaded shank 52 are mounted on the end fitting 18 by inserting the threaded shanks 52 upwardly through the holes 45 in the webs of the members 26 and 28 and screwing them into the threaded apertures 44 of the member 40. This effectively holds the members 26 and 28 in alignment for a furnace brazing operation which may be performed to more securely join the engaged portions of the webs thereof together.

It will be observed that the pins 46 are spaced to fit simultaneously in holes 54 in the flange 14 of the support member 10. They are preferably spaced apart by a distance equal to twice the spacing of the holes 54 and the midpoint between the pins is preferably offset from the longitudinal axis of the cross bar so that pitch splitting may be obtained by reversing the bar end for end as more clearly pointed out in the aforesaid co-pending application.

In order to provide sufficient material to enable the pins 46 to be offset as previously described, leg 56 of the lower member 28 is gradually bent outwardly as at 58, as most clearly illustrated in FIGURES 3 and 5, until it lies in the plane of the web of the member 28 as at 60, the excess portion being removed. The other leg 62 of the member 28 is cut away as at 64 so as to clear the horizontal flange 14 of the support member 10, and the web of the channel is cut away as at 66, as most clearly illustrated in FIGURE 5 to remove excess material. Leg 68 of the upper member 26 is also bent outwardly as at 70, as most clearly illustrated in FIGURES 2 and 4 to provide additional width for the web of the member 26.

A latch 72 having a handle portion 86 projecting to the right on the upper end thereof and a hook portion 80 projecting to the left on the lower end thereof is pivotally mounted on a pin 74 which is supported upon vertical flanges 76 of the member 40. The latch 72 extends through apertures 78 cut in the webs of the channels 26 and 28, and the hook portion 80 on the lower end thereof is adapted to engage the under side of the flange 14 to prevent the disengagement of the pins 46 from the holes 54 in the support member 10.

It will be observed that the material removed from the aperture 78 in the web of the lower channel 28 is bent downwardly to form a vertically extending tab 82 which provides a bearing surface for one end of a latch spring 84, the other end of the spring being fixed to the handle portion 86 of the latch 72 by a rivet 87 or the like. In this manner, the latch 72 is normally urged to the vertical position illustrated in FIGURE 1 and can be pivoted to the position indicated in dotted and dash lines wherein the hook portion 80 clears the flange 14 to permit the pins 46 to be disengaged from the holes 54 in the support member 10.

It will be observed that the point of contact between the hook portion 80 of the latch and the flange 14 is generally to the right of the axis of the pin 48 and, therefore, any up-loads on the cross bar will tend to pivot the latch in a clockwise direction, as viewed in FIGURE 1, which in turn tends to drive the latch into latching position. The arcuately shaped surface at the lower left side (as viewed in FIGURE 1) of the hook portion 80 of the latch 72 serves as a cam surface for pivoting the latch 72 from the latched position illustrated in FIGURE 1, toward the retracted position illustrated in broken lines in FIGURE 1, when the cross member is lowered into the position of attachment to the support member 10. When the pins 46 have moved into the flange holes 54, the latch 72 is returned to the full line position illustrated in FIGURE 1, both by the force of gravity and by the spring 84.

It will be observed that the web 24 is above the midplane of the cross bar as viewed in FIGURE 1 to enable the web of the channel 28 to engage the flange 14 at the midplane of the cross bar. Suitable wooden nailing boards 89, or the like, may be inserted endwise into the cross bar above and below the web 24 prior to attachment of the end fittings. A layer of plywood 88 or the like is disposed adjacent the web 24, as illustrated in FIGURE 1, to act as a spacer to enable the boards 89 to be of the same size. The boards 89 are recessed to receive the channels 26 and 28 of the end fittings and are provided with transversely extending apertures 90 providing access to the bolt 36 and the nut 37. The boards 89 are held against movement longitudinally out of the metal component 16 by bolts (not shown) extending through the boards 89, the web 24 and the plywood spacer 88.

The composite bar body provided by the generally H-shaped metal component 16 and the boards 89 is strong for its weight and in particular, has a high section modulus at right angles to the web 24, to which the flanges 20 contribute substantially. From the above description, it is apparent that the present invention also provides a lightweight cross bar having a simple but ruggedly constructed end fitting which can be easily connected to and removed from the support member 10 and can easily be telescopically mounted on the web of the cross bar. Further, the end fitting described will serve equally well as a fixed end fitting, rather than a telescoping filling, by simply providing circular holes in the webs of the channel-shaped members 26 and 28 in place of the longitudinal slots 34 which can be aligned with the hole 38 in the web 24 of the cross bar to permit the bolt 36 to be inserted therethrough to prevent telescoping.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A cargo bracing bar for attachment to a supporting surface extending substantially parallel to the bar and having apertures spaced therealong, said bar including a bar body having a longitudinally extending web and an end fitting, said end fitting comprising two channel-shaped members having the webs thereof joined together at one end with the remaining portions of the webs thereof in parallel spaced-apart relation, said spaced-apart portions of the webs being disposed over opposite sides of said web of said bar body, means connecting said portions to said web of said bar body, the legs of one of the channel-shaped members being removed adjacent said one end to permit the web thereof to rest on said supporting surface, and pin means projecting from said last-mentioned web for engaging said apertures in the supporting surface, and latch means mounted on said one end of said end fitting for engaging the under side of said supporting surface.

2. A cargo bracing bar for attachment to a supporting flange extending substantially parallel to the bar and having apertures spaced therealong, said bar including a bar body having a longitudinally extending web and an end fitting, said end fitting comprising two channel-shaped members having the webs thereof joined together at one end with the remaining portions of the webs in parallel spaced-apart relation, said spaced-apart portions of the webs being slidably disposed over said web of said bar body, the legs of one of the channel-shaped members being removed adjacent said one end to permit the web thereof to rest on said supporting surface, pin means projecting from said last mentioned web for engaging said apertures in the supporting flange, latch means mounted on said one end of the end fitting for engaging the underside of the supporting flange, and means for fastening said spaced-apart portions to the web of the bar body in a manner to limit the sliding movement therebetween.

3. The subject matter as claimed in claim 2 wherein said latch means comprises a latch extending through an aperture in the joined portions of the webs of the channel-shaped members, said latch having the upper end thereof pivotally mounted between the legs of the other of said channel-shaped members with the lower end having a hook portion formed thereon for engaging the underside of the supporting flange.

4. The subject matter as claimed in claim 2 wherein said one channel-shaped member has a tab projecting downwardly from the portion of the aperture furthest removed from said one end of the end fitting, and a flat steel spring is provided having one end mounted on said latch and bent so that the other end thereof resiliently engages said tab whereby the latch is normally urged to a latching position.

5. An end fitting for a cargo bracing bar for attachment to a supporting flange having apertures spaced therealong extending substantially parallel to the bar, said end fitting comprising first and second channel-shaped members mounted back-to-back with the webs thereof joined together at one end with the remaining portions thereof in parallel spaced apart relation and with the legs thereof extending in opposite directions, one of the legs of said first member being cut away adjacent one end thereof with the other leg thereof bent outwardly until it lies in the plane of the web of said one member and co-operates therewith to provide a support surface on said one member at said one end thereof adapted to rest on said supporting flange, pin means mounted on said end fitting and projecting from said surface of said one member for engaging said apertures in the supporting flange, the midpoint between said pin means being displaced from the longitudinal center line of said bar and said pin means including a pin mounted at least partially in said outwardly turned leg, and means for mounting the other end of said members on the end of said bar.

6. The subject matter as claimed in claim 5 wherein the leg of said second member adjacent to the bent leg of said first member is offset laterally to provide a wider web at said one end of the second member.

7. The subject matter as claimed in claim 6 including latch means for engaging said supporting flange to prevent the disengagement of said pin means from the holes in the supporting flange, said latch means comprising a latch extending through aligned apertures in the webs of said members adjacent said one end, a latch supporting member mounted on the web of said second member between said latch and said one end, the upper end of said latch being pivotally mounted on said latch supporting member, the lower end of said latch having a hook portion thereon for engaging the underside of said supporting flange, and spring means for normally urging said latch into latching position.

8. The subject matter as claimed 7 wherein said first member has a tab projecting downwardly from the web thereof, and said spring means comprises a flat spring having one end attached to the upper end of said latch and bent so that the other end thereof resiliently engages said tab.

9. A cargo bracing bar for attachment to a supporting flange extending substantially parallel to the bar and having apertures spaced therealong comprising a bar body having an I-beam cross section, first and second channel-shaped members having the webs thereof joined together at one end thereof and in parallel spaced-apart relationship at the other end thereof the spaced-apart webs of the members being slidably disposed over the longitudinally extending web of the cross bar, aligned longitudinal slots in the spaced-apart webs and an aligned aperture in the web of the bar body, a bolt passing through said slots and said aperture in the web for limiting the sliding movement therebetween, one of the legs of said first member being cut away adjacent said one end and the adjacent portion of the other leg thereof being bent outwardly until it lies in the plane of the web of said first member, the leg of the second member adjacent to the bent leg of the first member being offset outwardly to provide a wider web area at said one end, two laterally spaced pins projecting from the web of said first member for engaging said apertures in said supporting flange, the mid-point between said pins being displaced from the longitudinal center line of the bar body, a latch supporting member mounted on the web of said second member, said pin means passing through the webs of said members and threadably engaging said latch supporting member, a latch extending through the webs of the channels and having the upper end thereof pivotally mounted on the latch supporting member with the lower end thereof having a hook portion thereon for engaging the underside of the supporting flange, a tab projecting downwardly from the web of the first channel, and a flat steel spring having one end thereof fastened to the upper end of said latch and bent so that the other end thereof resiliently engages said tab.

References Cited in the file of this patent

UNITED STATES PATENTS

| | | |
|---|---|---|
| 1,064,130 | Conlin | June 10, 1913 |
| 2,425,875 | Hermann | Aug. 19, 1947 |
| 2,476,362 | Fahland | July 19, 1949 |
| 2,659,319 | Hermann | Nov. 17, 1953 |
| 2,725,826 | Tobin et al. | Dec. 6, 1955 |
| 2,739,776 | Terando | Mar. 27, 1956 |
| 2,769,404 | Dietrichson | Nov. 6, 1956 |
| 2,806,436 | Johnston | Sept. 17, 1957 |
| 2,817,549 | Fahland | Dec. 24, 1957 |
| 2,836,131 | Nampa et al. | May 27, 1958 |
| 2,837,039 | Schueder | June 3, 1958 |
| 2,879,722 | Dunlap | Mar. 31, 1959 |
| 2,887,963 | Dunlap | May 26, 1959 |